May 14, 1929.  D. J. CROWLEY  1,713,267
ARTIFICIAL TOOTH
Filed Feb. 15, 1928
Fig. 1.
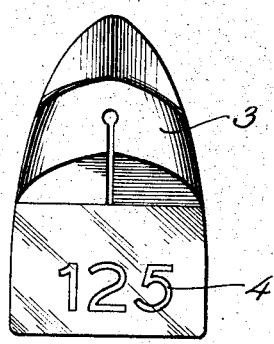
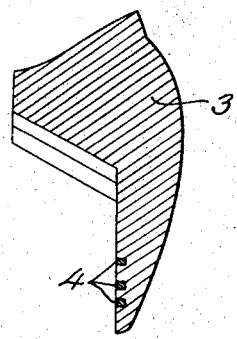
Fig. 2.
INVENTOR.
Daniel J. Crowley
BY
Lewis S. Clarkson
ATTORNEY.

Patented May 14, 1929.

UNITED STATES PATENT OFFICE.

DANIEL J. CROWLEY, OF WALTHAM, MASSACHUSETTS, ASSIGNOR TO THE COLUMBUS DENTAL MANUFACTURING COMPANY, OF COLUMBUS, OHIO, A CORPORATION.

ARTIFICIAL TOOTH.

Application filed February 15, 1928. Serial No. 254,417.

My invention relates broadly to artificial teeth, but is especially useful in connection with that class of artificial teeth known to the art commonly as interchangeable teeth. The invention comprehends a novel way of identifying shapes and sizes of teeth so that they may be duplicated in stock by the manufacturer, ordered in duplicate by the dealer from the manufacturer or obtained in duplicate from the dealer by the dentist, all parties being familiar with the utility and purpose.

Heretofore, it has been most common to provide artificial teeth with an embossed or raised identification character, the latter usually appearing on the lingual surface of crown teeth and on the ridgelap surface of vulcanite, pin and interchangeable teeth, and molded and baked integrally with such teeth. Letters and figures have been commonly used as identification characters.

In the application of artificial teeth, to a patient's mouth, it is often necessary to alter the tooth size in order to fit the tooth to a given case. This alteration consists in grinding the porcelain tooth with stones, and it usually happens that the embossed characters are entirely removed. This procedure is particularly practiced where it is desired to cover the ridgelap surface of the tooth with metal, or where the rdigelap surface of the tooth makes direct contact with the soft gum tissue, or where the concave curvature of the ridgelap surface of the tooth does not conform to the convex curvature of the gum tissue, or where it is desired to shorten an artificial tooth, the requirements of the case demanding that the tooth be shortened from the ridgelap end. It is also common practice for the dentist to remove the embossed characters from the lingual surface of crown teeth because these embossed characters are a source of irritation to the tongue, hence, an annoyance to the patient. All of this applies to artificial teeth in general.

In consideration of the present development of the art as it applies to interchangeable teeth, it is universal practice for the manufacturer to market precious metal backings or supports in association with the porcelain teeth. The porcelain interchangeable teeth are machined or ground to certain predetermined dimensions so that they fit accurately the precious metal backings; it being understood that each tooth and backing engages by interlocking means. It is important to note that the process of manufacture necessitates the grinding of the surface or surfaces of an interchangeable artificial tooth that comes in contact with the backing, hence, any embossed characters appearing on this surface, or surfaces, are removed during the manufacture. Therefore, these characters lose identity and are valueless to those parties subsequently handling the teeth. The common method employed in the manufacture of interchangeable teeth is to place the embossed identification characters on the ridgelap surface from which surface they are usually subsequently removed through grinding by the dentist for the reasons previously generally explained. The chief utility of artificial interchangeable teeth is known to reside in the fact that if a tooth be broken in service a repair can be made without necessitating the removal of the metal supporting bridge structure from the patient's mouth; further, a duplicate tooth can be obtained by the dentist from the dealer or from the manufacturer by referring to the identification character. These features are important for they save time, expense and inconvenience both to the dentist and to the patient.

The chief objects of my invention are to provide artificial teeth with identification characters that cannot be removed by the ordinary grinding necessitated in manufacture or in the practical application of the teeth in the art.

Another object of my invention is to employ identification characters of dissimilar color from each other and, or dissimilar color from the tooth structure so the characters may be more easily read and that different colors may define different classes of artificial teeth.

In the drawings:

Figure 1 is an elevation of a tooth looking at its lingual face, embodying my invention.

Figure 2 is a vertical sectional view of the same.

In the drawing the reference numeral 3 designates an artificial tooth, which is provided with a sufficiently deeply inlaid or imbedded identification character 4.

In making use of the embossed characters in the past difficulty in readily reading them has been encountered. It is known that porcelain is matured by heat treatment, during which heat treatment the ware undergoes considerable shrinkage and distortion. This is especially true of the surface of the ware and is outstandingly true in the maturing of artificial teeth which latter present highly glazed surfaces. The heat treatment imposed during the maturing and manufacture of artificial porcelain teeth also causes the embossed numbers to become less distinct so that they are read with considerable difficulty and in some instances cannot be read at all. Further, some figures are readily mistaken for other figures (such as "3" may be mistaken for an "8"). Likewise, some letters may be confused with each other (such letters as "C", "D", "G", "O", and "Q") when employing the present embossed symbol method. This confusion is especially pronounced in ware that has received a slightly excessive heat treatment.

In making use of my invention, this difficulty is overcome and the identification characters can be readily distinguished and clearly read after normal and even excessive heat treatment.

In the past it has been a difficult problem to number artificial teeth in a general way because there are not only quite a number of varieties or classes, but the surfaces are quite small and limited, making it imperative to use but few identification characters. This difficulty may be overcome by making use of my method wherein I propose to use a different colored identification character to represent different varieties or classes of artificial teeth. It is understood that by making use of this method a limited quantity of characters may be employed and sufficient space can be found on the surface of an artificial tooth to place them advantageously. This combination of characters and colors offers a sufficient latitude to cover a most extensive manufacturing program in a very simple way.

My invention may be applied to any of the various classes of artificial teeth and particularly lends itself to being placed in any desired surface without danger of being subsequently removed by ordinary grinding. Therefore, this invention is particularly applicable to interchangeable teeth wherein the identification character can be placed in the surface, or surfaces, designed to approximate the metal backing, which surface, or surfaces are standardized through grinding by the manufacturer. When employing my invention in this respect, the identification characters remain permanent, for it is very rare, indeed, that these standard ground surfaces are altered by the dentist.

My invention comprehends the use of a sufficiently deeply inlaid or imbedded identification character in the porcelain tooth structure, distinctly dissimilar in color from the tooth and designed to be flush with the immediately adjacent porcelain structure, so that the inlaid material composing the identification character, or characters, forms a relatively smooth and substantially even contour with the surface of the tooth in which it is placed, whether the tooth be ground or unground. The results accomplished by my invention remove the sources of irritation to the oral tissues, that has been common in past methods. The identification character is preferably composed of porcelain carrying a pigment or color although it may be composed of any other suitable material.

What I claim is:

1. As a new article of manufacture an artificial tooth having an inlaid designating symbol.

2. As a new article of manufacture an artificial tooth having an inlaid designating symbol in the lingual surface of the tooth.

3. As a new article of manufacture an artificial tooth having an inlaid designating colored symbol.

4. As a new article of manufacture an artificial tooth having a deeply inlaid identification character in the porcelain tooth structure.

5. As a new article of manufacture an artificial tooth having a deeply inlaid identification character in the porcelain tooth structure distinctly dissimilar in color from the tooth and flush with the immediate adjacent porcelain structure.

In testimony whereof I affix my signature.

DANIEL J. CROWLEY.